United States Patent
Baker et al.

(10) Patent No.: US 6,698,545 B2
(45) Date of Patent: Mar. 2, 2004

(54) ESCAPE SLIDE

(75) Inventors: Jeffrey A. Baker, Phoenix, AZ (US); Leibert K. Danielson, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 10/120,076

(22) Filed: Apr. 9, 2002

(65) Prior Publication Data

US 2002/0117354 A1 Aug. 29, 2002

Related U.S. Application Data

(63) Continuation of application No. 09/413,838, filed on Oct. 6, 1999, now abandoned.

(51) Int. Cl.[7] .............................................. B64D 25/00
(52) U.S. Cl. ..................................... 182/48; 244/137 P
(58) Field of Search ........................ 182/48; 244/137 P

(56) References Cited

U.S. PATENT DOCUMENTS

| | | | | | |
|---|---|---|---|---|---|
| 1,596,552 A | * | 8/1926 | Potter | ........................ | 182/47 |
| 3,829,353 A | * | 8/1974 | Fisher | .................... | 139/384 R |
| 3,910,377 A | * | 10/1975 | Zamorski | ...................... | 182/48 |
| 3,973,645 A | * | 8/1976 | Dix et al. | ...................... | 182/48 |
| 4,394,173 A | * | 7/1983 | Aste | ............................ | 104/69 |
| 4,434,870 A | * | 3/1984 | Fisher | ........................ | 182/48 |
| 4,487,411 A | * | 12/1984 | Ahrens | ........................ | 472/116 |
| 4,846,422 A | * | 7/1989 | Fisher | ........................ | 182/48 |

* cited by examiner

*Primary Examiner*—Alvin Chin-Shue
(74) *Attorney, Agent, or Firm*—Jerry Holden; John D. Titus

(57) ABSTRACT

An aircraft life raft assembly for use as a deployable escape slide from an egress opening of an aircraft. The escape slide is a longitudinally extending structure with a center line that extends from the head end of the slide, adjacent the egress opening, to a toe end that is located adjacent the horizontally extending ground plane. Pressurizing means is operative to inflate the escape slide, which escape slide has panels or panel members of flexible material with an upper sliding surface that extends in the longitudinal direction. The escape slide has a portion of its length that is curvilinear in plan view, which curvilinear portion maybe close to the egress opening of the aircraft or anywhere along the length of the escape slide.

2 Claims, 6 Drawing Sheets

ESCAPE SLIDE

This is a continuation of Application No. 09/413,838 filed Oct. 6, 1999.

FIELD OF THE INVENTION

This invention relates to an inflatable life raft escape slide for aircraft and more particularly to a new and improved escape slide for use in evacuating passengers from especially high exits as well as those portions of an aircraft that have external obstructions.

BACKGROUND OF THE INVENTION

In normal structures of an aircraft, it has been satisfactory to provide a plurality of deployable escape slides from the various exits with slides providing a straight line path from the aircraft's doors and egress openings to the ground level. These inflatable straight line escape slides in larger aircraft often dictated the location of the egress doors and exits on the aircraft design even though it would be more desirable to provide an exit opening at another location but because of an external obstruction the exit had to be relocated. In some instances it was found necessary and desirable to connect the door's exit with an inflatable walkway onto a wing of an aircraft. Then, these walkways would be connected to an inflatable slide that extended to the ground surface.

In other instances a porch type structure is used as part of the inflatable slide that is situated adjacent to the aircraft body. The porch inflatable portion of the slide, which is horizontal, provides a turn in direction from the exit door to that portion of the inflatable slide that evacuates the passengers away from the aircraft.

The present invention is directed to a structural design of an inflatable escape slide that accommodates the location of the egress door and openings as needed by design even where there are external obstructions by the use of an inflatable escape slide that has a curvilinear portion, which curvilinear portion may be located near the egress door or further along the escape slide. It is the curvilinear portion that avoids the design obstructions such as wing configurations and nacelles for aircraft engines. In addition the escape slide of the present invention utilizes a double septum chambered construction which permits its use on aircraft structures that require slides of greater overall length since aircraft are larger in construction, height, width and accommodations. The double septum chambers provide greater strength with greater resistance to deformation forces. By use of the present invention, the cumbersome structure of the inflatable porch is eliminated thereby eliminating the significant weight and bulk to the inflatable slide that the porch added to the slide structure.

SUMMARY OF THE INVENTION

An aircraft inflatable life raft escape slide for use from an elevated structure such as an aircraft where such inflatable escape slide is deployable from an egress opening having its head end at such elevated openings and a toe end, upon deployment, located adjacent the ground level. The escape slide has an upper sliding surface with a longitudinally extending center line and with a portion of such escape slide being curvilinear in plan view to facilitate its deployment where there are obstructions such as the wing portions of an aircraft and its engine nacelles. This structure permits the aircraft design to accommodate the proper spacing of escape slides along it entire length. In addition, the escape slide has the curvilinear portion skewed to enhance the safe movement along the slides's length at the curvilinear portion as there is a change in directional movement of the evacuee, otherwise there is a continual movement in the same direction by the law of physics. This structure is thus extremely useful in view of the fact that aircraft structures have become increasingly larger and it is necessary to take into consideration the increased speeds that occur in evacuating passengers from these increased elevated structures. The escape slide is also provided with a double septum chamber structure to increase its resistance to deformation under load and adverse weather conditions.

DETAILED DESCRIPTION

Figure 1:
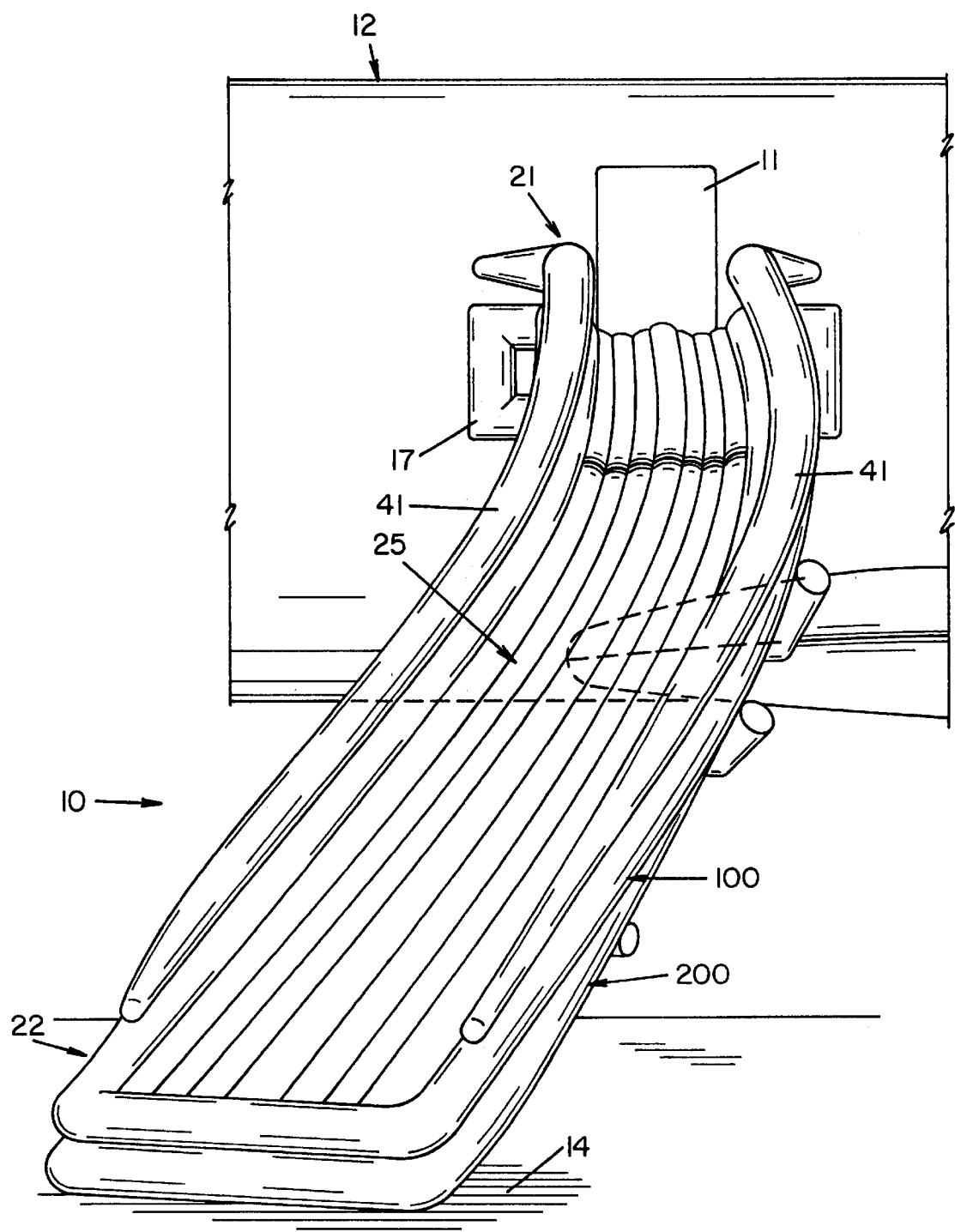
FIG. 1 is a perspective view of an inflatable escape slide extending from an aircraft fuselage to the ground.
Figure 2:
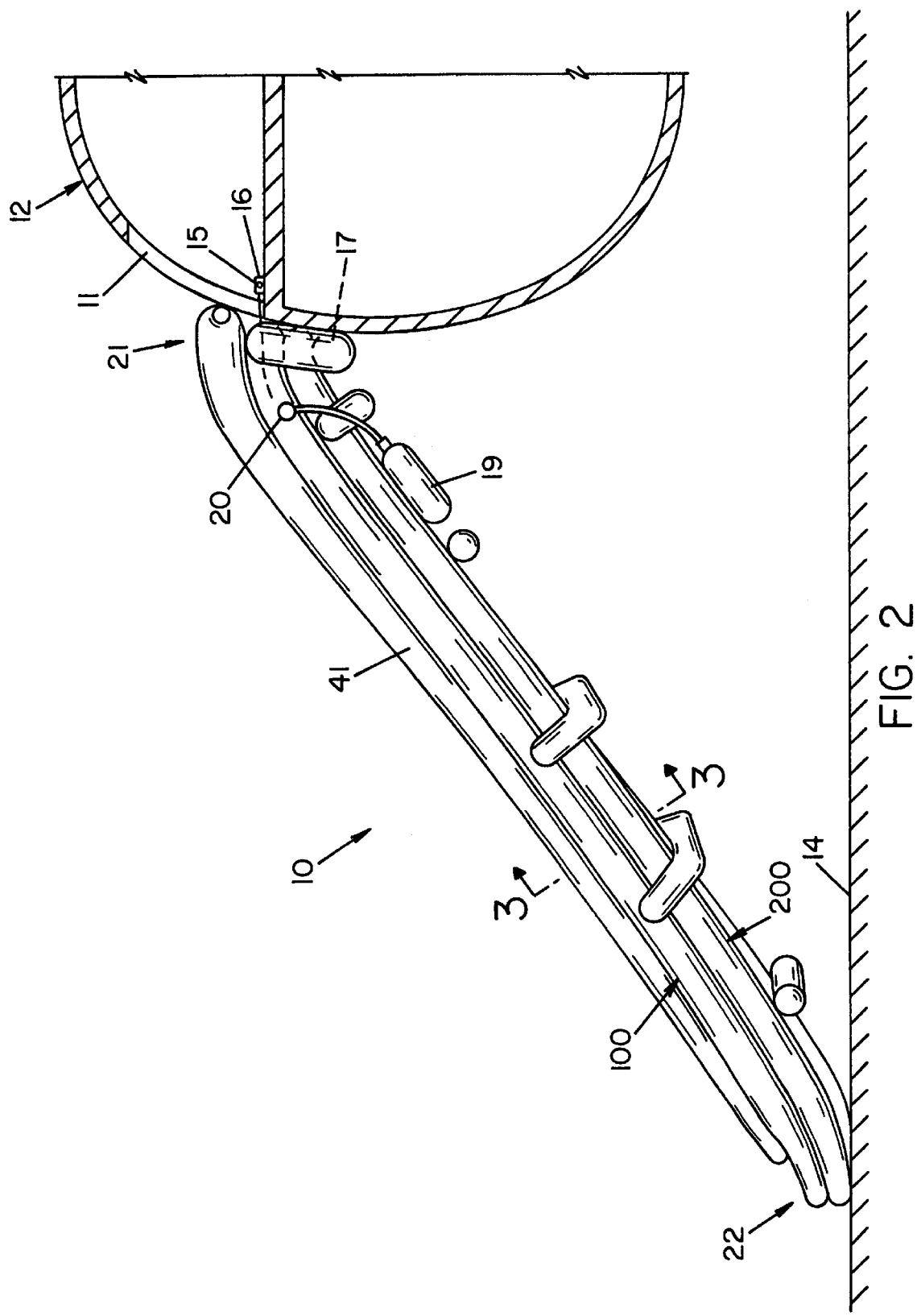
FIG. 2 is a side elevational view of the inflatable escape slide extending from an egress door of an aircraft's fuselage to a ground level.

Referring now to the drawings, wherein like reference characters designate like or corresponding parts throughout the several views, there is shown in FIGS. 1 and 2 an inflatable life raft escape slide 10 deployed from an egress door 11 of an aircraft fuselage 12 to the surface of the ground 14 so that passengers may safely slide down the slide 10 from the aircraft to the ground 14. The escape slide 10 is releasably fastened to the fuselage 12 by a girt bar 15 that is located adjacent to the egress door 11, which girt bar 15 is secured to spaced brackets 16 in a manner old and well known in the art. A positioning tube 17, which is connected to the escape slide 10 is located between the slide 10 and the fuselage 12 to aid in the positive positioning of the escape slide during deployment. The inflation system includes a source of high pressure fluid as container 19 which is suitably secured to the escape slide and upon actuation delivers pressurized fluids to an aspirator 20 or aspirators for pressurizing the escape slide 10 and the positioning tube 17.

The escape slide 10 has a head end 21 and a toe end 22. The entire escape slide 10 is fabricated from a fabric of suitable material and coated with an elastomer. The various parts of the escape slide 10 are joined together with a suitable adhesive whereby the composite structure to be described will permit air flow to the various internal chambers via suitable passageways but will preclude the air flow externally from the various chambers in the inflated condition.

The escape slide 10 has an upper longitudinally extending panel or panel member 25 and a lower longitudinally extending panel or panel member 26 that are suitably connected at their respective sides in a manner to be described. Slide 10 also includes a plurality of longitudinally extending flexible partitions or bulkheads 30, 31, 32, 33, 34, 35, 36 and 37 that extend along the inside thereof and are suitably adhered along their respective running edges to the upper panel member 25 and the lower panel member 26. The respective bulkheads 30 and 37 are slanted inwardly and upwardly relative to a longitudinal center line of the escape slide which center line is designated 38 in FIG. 4. The respective partitions 33 and 34 are slanted outwardly and upwardly relative to the center line 38. The remaining bulkheads extend in a general vertical direction. By thus slanting the bulkheads 30, 37, 33 and 34 in the manner described, the load forces imparted by the passengers on the upper panel 25 distributes the forces with less distortion of the tubes or chambers as formed by the bulkheads. The chambers formed by the use of the partitions 30 through 37 with the upper panel 25 and the lower panel 26 are all in communication with each other to facilitate the inflation of all the chambers.

The upper panel 25 and the lower panel 26 cooperate with the bulkheads 30 through 37 to create a series of longitudinally extending chambers which are in suitable communication with each other. The chambers are indicated as 1, through 9. The center chamber 5 is fabricated to have a higher crown to thereby provide a raised portion to separate the sliding surface of the upper panel 25 into two sliding pathways.

Figure 4:
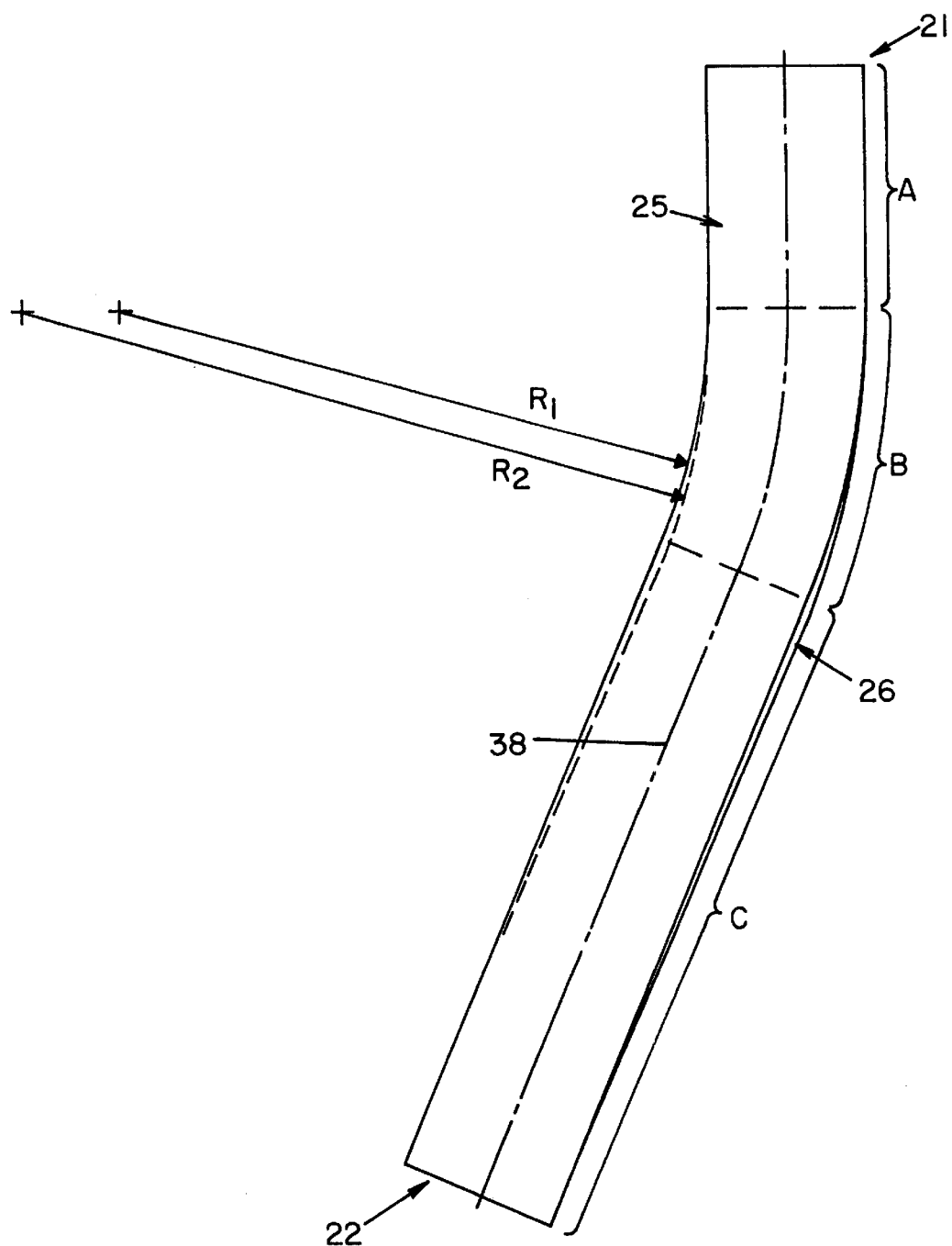
FIG. 4 is a diagrammatic plan view of the upper and lower panels of the escape slide prior to the panels being joined.
Figure 5:
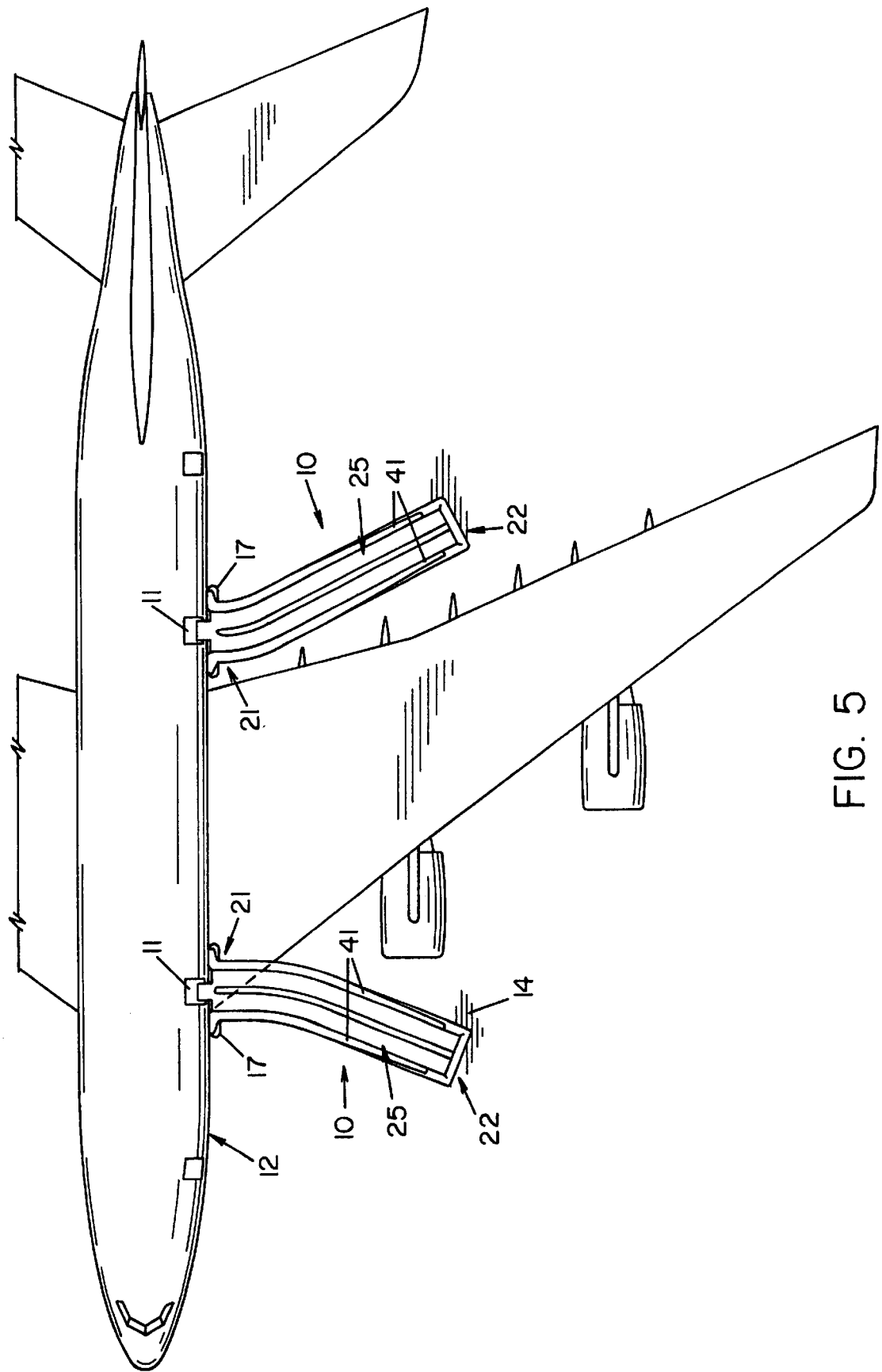
FIG. 5 is a fragmentary diagrammatic plan view of an aircraft with deployed escape slides showing the curvilinear portion close to the egress door of an aircraft.
Figure 6:
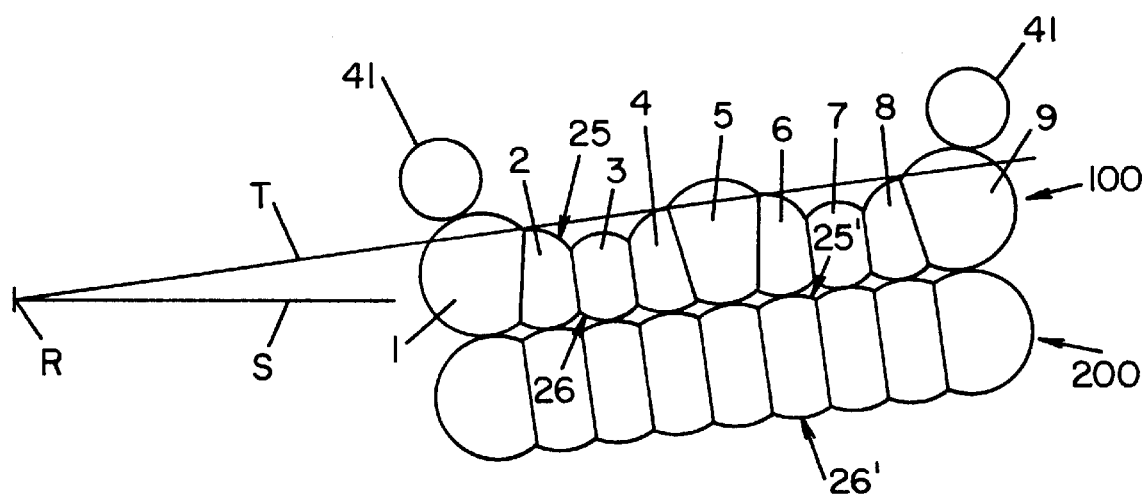
FIG. 6 is a fragmentary diagrammatic cross sectional view of the escape slide along a curvilinear portion illustrating the skew relationship of the sliding surface from the outer periphery to the inner periphery.

The upper panel 25 is composed of three panel sections (as shown in FIG. 4) A, B and C respectively. As seen in plan view sections A and C are linear in plan view whereas section B is curvilinear. Section A may be much shorter in length than section C, thus placing the curvilinear section B close to the egress door 11 of the aircraft as shown in FIG. 5. Prior to the joining of the upper panel section B to the lower panel section B, FIG. 4 shows the upper panel's edge section as having an inner peripheral radius of curvature of R-1 whereas the lower panel's edge section B as having an inner peripheral radius of curvature of R-2 wherein R-2 is greater than R-1. The width of these panels 25 and 26 are equal and it should be noted that the outer peripheral edges or margins of the respective panels are similarity curved with panel 25's edge having a shorter radius of curvature than panel 26 at these same areas. The sections when secured together at their side edges will skew the curvilinear portion to thereby raise the outer periphery of the curvilinear portion or section relative to the inner periphery portion or section thereby forming a banked curve. This feature is depicted in FIG. 6 wherein a line T makes an acute angle with a line S where line T represent a line that abuts the top surface of the top panel (excluding the center larger chamber 5) while line S represents a line parallel to the ground surface that intersects the line T at an apex R, the locus of points defined by lines T throughout curved section B defining the mean surface of slide 10. Another way of stating this relationship is that a plane perpendicular to the ground and passing through the curvilinear portion of the escape slide would intersect the sliding surface of such slide along the upper panel 25 along a line which could be the mean line of the upper panel that makes an acute angle with a line that is parallel to a horizontally extending ground surface and also intersects the extension of the mean line of the upper panel curvilinear section. Mean line is used herein as the average value between the highest and lowest points of the crowns of the upper panel excluding the center raised crown and is shown as a straight line. Accordingly the sliding surface of the escape slide at the curvilinear portion is banked inwardly toward the egress door 11 along section B of the upper panel 25. With reference to FIGS. 4 and 6, by the "curvilinear portion being banked inwardly toward the egress," what is meant is that the curved portion B is concave toward the egress door 11 (i.e. having a center curvature "C" that in plan view is closer to a plane "P—P" defined by egress door 11 than is the path center 55 of the arc formed by section B) and that a ray "O" extending generally upward normal to the mean surface of slide 10 in curved portion B has a component "X" that in plan view extends in a positive direction toward the center of curvature "C". This banking or skewing of the curved portion B can also be achieved by other means as by making panel 26 of greater width at the curvature.

Figure 3:
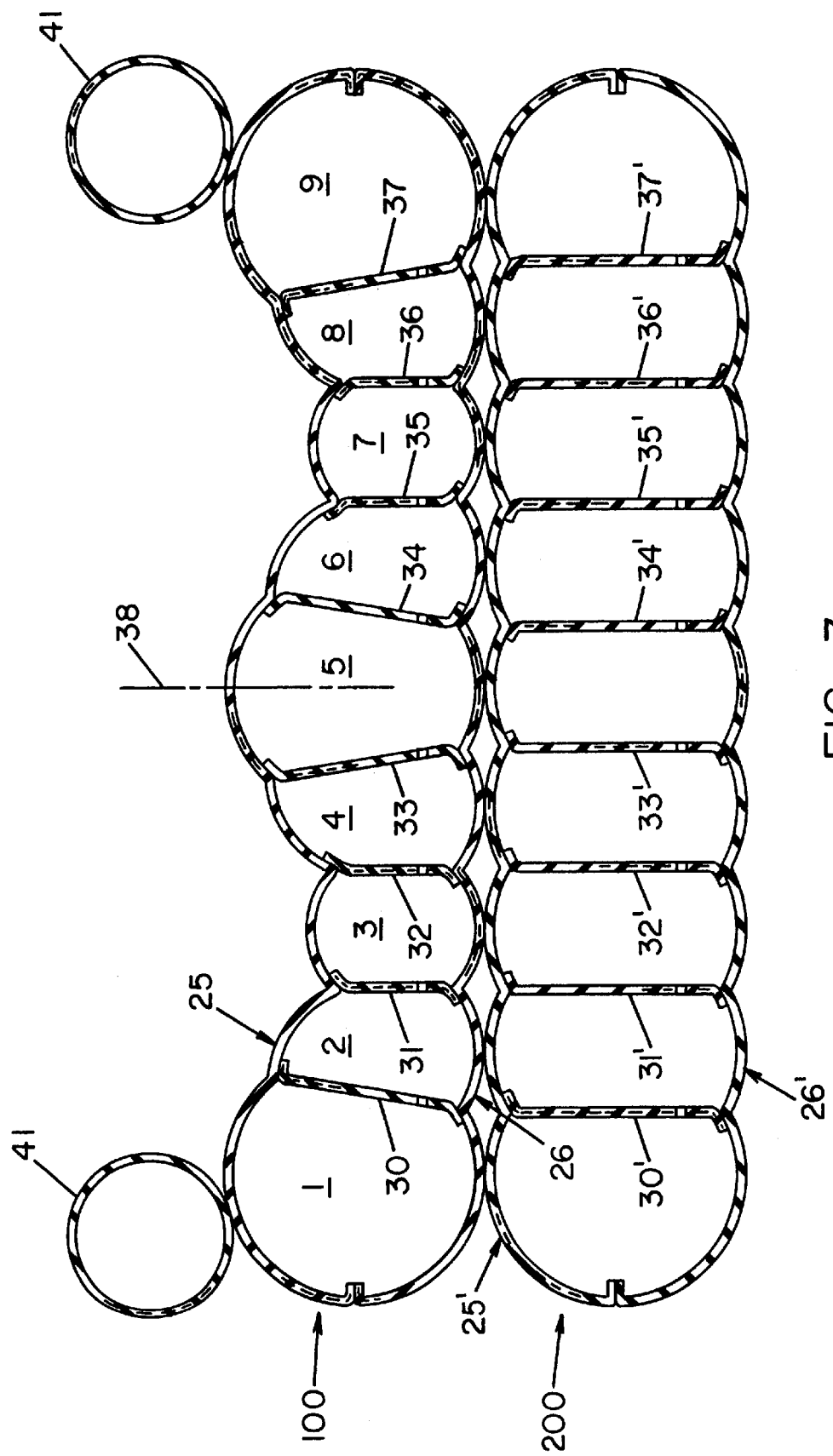
FIG. 3 is a cross sectional view of the inflatable escape slide of FIG. 2 taken on line 3—3 of FIG. 2.

The above described structure of the upper panel 25, lower panel 26 and the bulkheads 30 through 37 form an elongated or longitudinally extending upper flexible septum chamber which in FIG. 3 is designated by the numeral 100. Substantially coextensive in length with the upper septum structure or chamber is an elongated or longitudinally extending lower flexible septum structure or septum chamber 200 which septum chamber 200 is substantially identical in construction to the upper septum chamber 100. Lower septum structure 200 has its own upper panel 25', and lower panel 26' along with its own bulkheads 30', 31', 32', 33', 34', 35', 36' and 37' thus providing a plurality of tubular members.

Inflatable guide rail bumpers or tubes 41 are suitably bonded at the upper respective margins of the escape slide as shown in FIGS. 1, 2, 3 and 5.

In the operation as a deployed slide the upper panel 25 in its undulating upper surface of valleys and crown portions provides an unusual advantage particularly considering its use on larger aircraft. Historically wet sliding conditions have presented significant problems in design as evacuees would have a strong tendency to hydroplane. In longer slides of the conventional smooth surface type, which are employed at higher sill heights, the evacuees will gain excessive speeds due to hydroplaning and will exit the slide beyond reasonable exit velocities. The channeling of water flow into the valleys of the undulating upper panel 25 will leave the crown or contact portion that is clear of water thereby assuring the evacuees an exit of reasonable speeds even under the most adverse conditions. A particular advantage of using an upper septum chamber 100 and a lower septum chamber 200 is that such structures improve bending resistance characteristics over conventional stacked "round" tubes structures with their trusses. The septum structure minimizes lateral deflection of the escape slide under strong wind conditions while maximizing the overall beam strength for use in large scale aircraft. A further advantage of using the double stacked septum chamber structure is that when used as a slide raft in the ditching mode, the increased size and volume of the lower septum chamber results in a higher raft above the critical water level in high waters with loaded passengers since there is a lower displacement depth in the water (because the lower septum chamber is pressurized and makes the upper septum chamber side higher in the water).

Various modifications are contemplated and may obviously be resorted to by those skilled in the art without departing from the described invention, as hereinafter defined by the appended claims.

We claim:
1. An aircraft evacuation slide assembly for use from an elevated egress opening of an aircraft comprising:
   an escape slide member having a head end and a toe end, said head end being adapted to be located adjacent said egress opening, said toe end in a deployed condition being adapted to be located adjacent a horizontally extending ground plane at an elevation below that of said egress opening, said escape slide member comprising a first plurality of inflatable tubular members composed of a flexible airtight material extending in a deployed condition from said head end to said toe end, said first plurality of inflatable tubular members cooperating to form a structure having an upper surface adapted to extend from a location proximal said egress opening to a location proximal said ground plane a second plurality of inflatable tubular members composed of a flexible airtight material airtight material adapted to extend in a deployed condition from said head end to said toe end, said second plurality of inflatable tubular members being attached to a lower surface of said first plurality of inflatable tubular members, said first and second plurality of inflatable tubular members cooperating when inflated to a predetermined pressure to form a structure that is self supporting between said head end and said toe end and capable of supporting a passenger sliding on said upper surface from said head end to a position proximal said toe end, said upper surface forming in plan view at least an upper section and a lower section, said upper section being adapted to be disposed proximal said egress opening and having in plan view a curvilinear outline, said lower section being adapted to be disposed proximal said horizontal ground plane and having in plan view a linear outline;

said upper surface being adapted to be sloped downwards and banked inwards toward said egress opening for at least a portion of said upper section, wherein said first plurality of inflatable tubular members includes an upper, outer tubular member having a longitudinal centerline defining a first radius of curvature;

said second plurality of inflatable tubular members includes a lower, outer tubular member having a longitudinal centerline defining second radius of curvature;

said second radius of curvature being greater than said first radius of curvature, whereby said upper and lower outer tubular members cooperate to skew said upper surface such that said upper surface is banked inward toward said egress opening.

2. An aircraft evacuation slide assembly for use from an elevated egress opening of an aircraft comprising:

an escape slide member having a head end and a toe end, said head end being adapted to be located adjacent said egress opening, said toe end in a deployed condition being adapted to be located adjacent a horizontally extending ground plane at an elevation below that of said egress opening, said escape slide member comprising a first plurality of inflatable tubular members composed of a flexible airtight material extending in a deployed condition from said head end to said toe end, said first plurality of inflatable tubular members cooperating to form a structure having an upper surface adapted to extend from a location proximal said egress opening to a location proximal said ground plane a second plurality of inflatable tubular members composed of a flexible airtight material airtight material adapted to extend in a deployed condition from said head end to said toe end, said second plurality of inflatable tubular members being attached to a lower surface of said first plurality of inflatable tubular members, said first and second plurality of inflatable tubular members cooperating when inflated to a predetermined pressure to form a structure that is self supporting between said head end and said toe end and capable of supporting a passenger sliding on said upper surface from said head end to a position proximal said toe end, said upper surface forming in plan view at least an upper section and a lower section, said upper section being adapted to be disposed proximal said egress opening and having in plan view a curvilinear outline, said lower section being adapted to be disposed proximal said horizontal ground plane and having in plan view a linear outline;

said upper surface being adapted to be sloped downwards and banked inwards toward said egress opening for at least a portion of said upper section, wherein said first plurality of inflatable tubular members includes an upper, inner tubular member having a longitudinal centerline defining a first radius of curvature;

said second plurality of inflatable tubular members includes a lower, inner tubular member having a longitudinal centerline defining a second of curvature;

said second radius of curvature being greater than said first radius of curvature, whereby said upper and lower inner tubular members cooperate to skew said upper surface such that said upper surface is banked inward toward said egress opening.

\* \* \* \* \*